United States Patent
Von Duntz

(10) Patent No.: US 10,123,188 B2
(45) Date of Patent: Nov. 6, 2018

(54) HOLIDAY TELEPHONE APPARATUS, SYSTEM AND METHOD

(71) Applicant: Kathleen M. Von Duntz, Watertown, CT (US)

(72) Inventor: Kathleen M. Von Duntz, Watertown, CT (US)

(*) Notice: Subject to any disclaimer, the term of this patent is extended or adjusted under 35 U.S.C. 154(b) by 0 days.

(21) Appl. No.: 15/636,717

(22) Filed: Jun. 29, 2017

(65) Prior Publication Data

US 2018/0014141 A1 Jan. 11, 2018

Related U.S. Application Data

(60) Provisional application No. 62/359,776, filed on Jul. 8, 2016.

(51) Int. Cl.
| | |
|---|---|
| *H04W 8/00* | (2009.01) |
| *H04M 1/725* | (2006.01) |

(Continued)

(52) U.S. Cl.
CPC ............. *H04W 4/50* (2018.02); *A63H 5/00* (2013.01); *A63H 33/26* (2013.01);
(Continued)

(58) Field of Classification Search
CPC ...... A63H 5/00; A63H 33/26; A63H 33/3016; A63H 2200/00; H04M 1/7255;
(Continued)

(56) References Cited

U.S. PATENT DOCUMENTS

| | | |
|---|---|---|
| D315,904 S | 4/1991 | Cheng |
| 5,609,508 A | 3/1997 | Wingate |

(Continued)

FOREIGN PATENT DOCUMENTS

CN 204428841 7/2015

*Primary Examiner* — Dinh Nguyen
(74) *Attorney, Agent, or Firm* — Michael A. Blake

(57) ABSTRACT

A holiday telephone system comprising: a smartphone; a holiday telephone in wireless communication with the smartphone; a holiday telephone app installed on the smartphone, where the app is configured to perform a method, the method comprising: creating a new message by inputting a message into the app via the smartphone; selecting an elf character to speak the message; scheduling the app to cause the holiday telephone to ring at predetermined date, and time; and playing the message as recited by the elf character when the telephone is answered. A non-transitory computer-readable medium includes a set of instructions stored thereon that when accessed by a processor enable the processor to perform a method of creating and scheduling a message to be delivered via a telephone, the method comprising: opening a messages page by default; determining whether the user selects to continue with messages; creating a new message if the user selects to continue with messages; determining whether the user selects to use most recently messaged child; choosing select elf, edit elf, or add new elf, if the user selects to use most recently messaged child; selecting an elf character, if the user chose select elf option; choosing enter message or quick message; entering message, if the user chose enter message option; choosing call now or schedule time for message; entering date and time for telephone message to be delivered to a telephone, if the user chose schedule time for message; displaying scheduled message; changing elf name, changing ringtone associated with elf, changing voice associated with elf, changing gender of elf, if the edit elf option was selected in the choosing select elf, edit elf, or add new elf query; returning to the selecting an elf character query; entering name of new elf; entering gender of new elf, selecting ringtone associated with new elf, selecting voice associated with new elf, if add new elf is selected at the choosing select elf, edit elf, or add new elf query.

12 Claims, 14 Drawing Sheets

(51) Int. Cl.
*A63H 33/26* (2006.01)
*A63H 33/30* (2006.01)
*A63H 5/00* (2006.01)
*H04W 4/50* (2018.01)
*H04W 4/80* (2018.01)

(52) U.S. Cl.
CPC ...... *A63H 33/3016* (2013.01); *H04M 1/7253* (2013.01); *H04M 1/7255* (2013.01); *H04M 1/72552* (2013.01); *H04M 1/72566* (2013.01); *H04W 4/80* (2018.02); *H04W 8/005* (2013.01); *A63H 2200/00* (2013.01); *H04M 2250/02* (2013.01)

(58) Field of Classification Search
CPC ........... H04M 1/7253; H04M 1/72552; H04M 1/72566; H04M 2250/02; H04W 4/001; H04W 4/008; H04W 8/005; H04W 4/50; H04W 4/80
See application file for complete search history.

(56) References Cited

U.S. PATENT DOCUMENTS

| | | |
|---|---|---|
| 5,787,151 A | 7/1998 | Nakatsu |
| 5,864,604 A | 1/1999 | Moen |
| 6,317,486 B1 | 11/2001 | Hollins |
| 6,659,835 B1 | 12/2003 | Allen |
| 6,692,328 B1 | 2/2004 | Reinberg |
| 6,718,013 B2 | 4/2004 | Turner |
| 6,950,502 B1 | 9/2005 | Jenkins |
| 7,409,230 B2 | 8/2008 | Bae |
| 7,798,885 B2 | 9/2010 | Wong |
| 9,088,861 B2 | 7/2015 | Prakash |
| 2003/0156134 A1* | 8/2003 | Kim ..................... G06Q 10/107 715/753 |
| 2003/0215084 A1* | 11/2003 | Obeso ................... H04M 3/424 379/355.01 |
| 2009/0003556 A1 | 1/2009 | Mathew |
| 2009/0037413 A1* | 2/2009 | Castell ................ G06Q 10/107 |
| 2015/0201313 A1* | 7/2015 | Celik ................ H04M 1/72519 455/414.1 |

\* cited by examiner

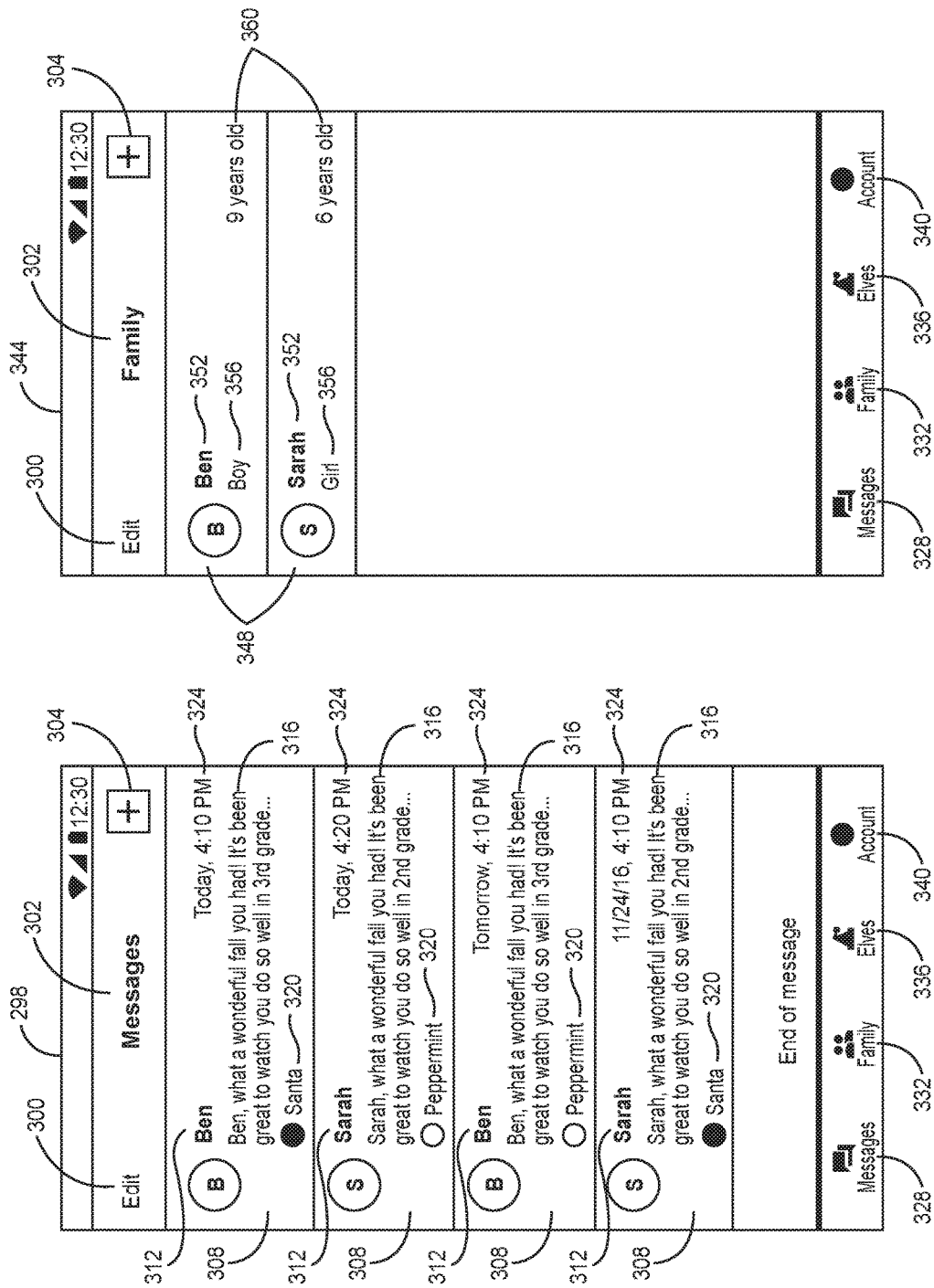

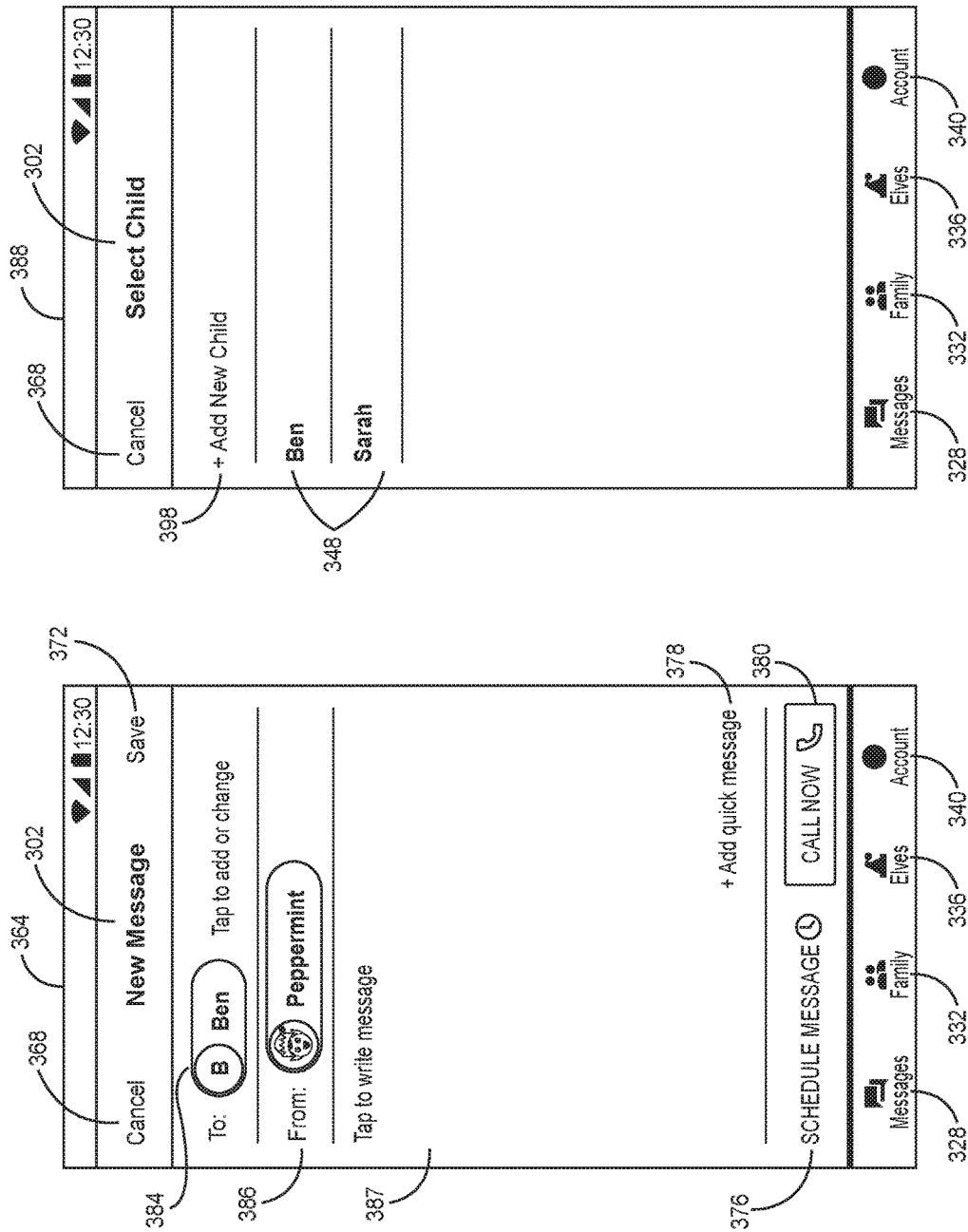

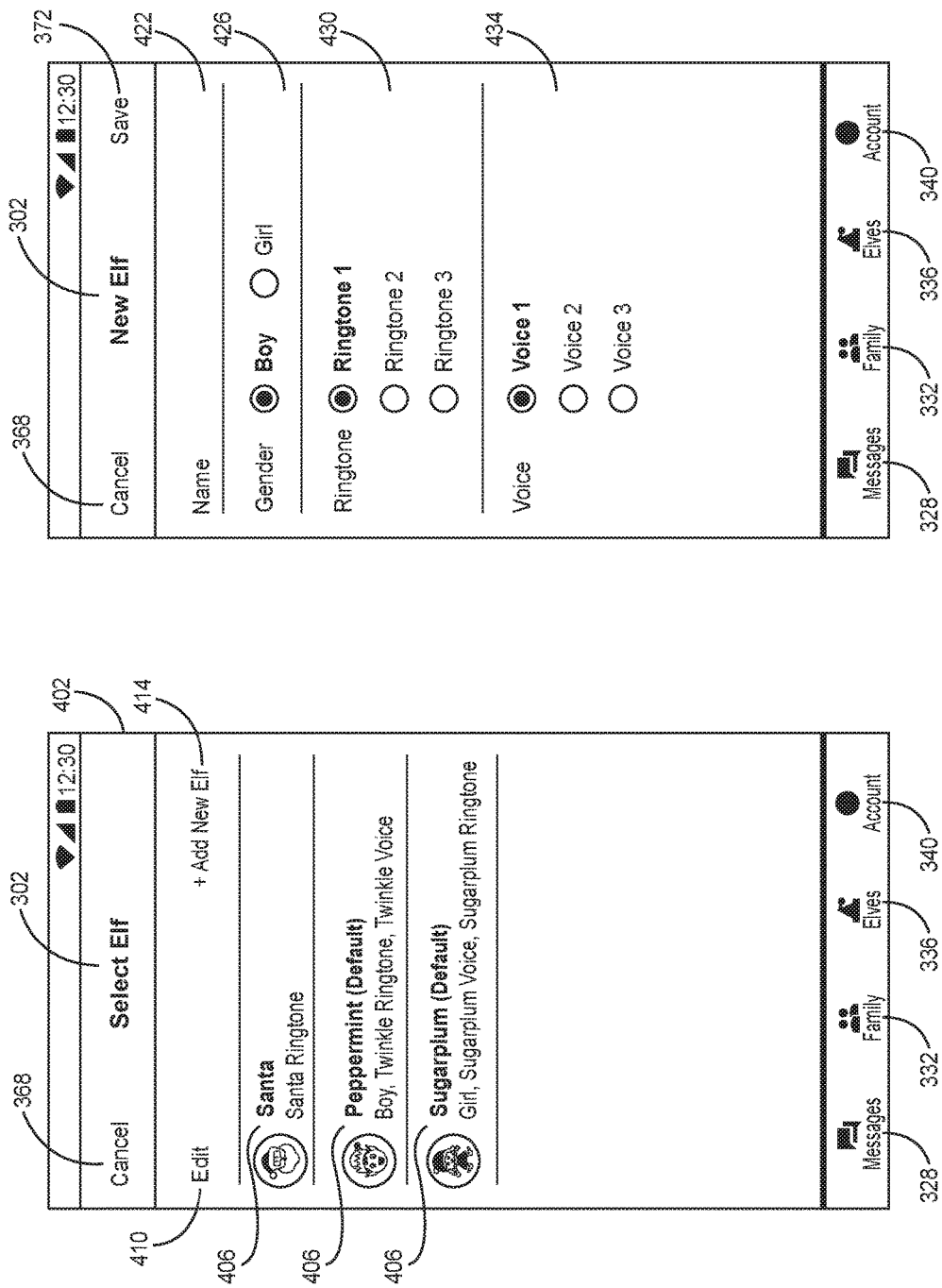

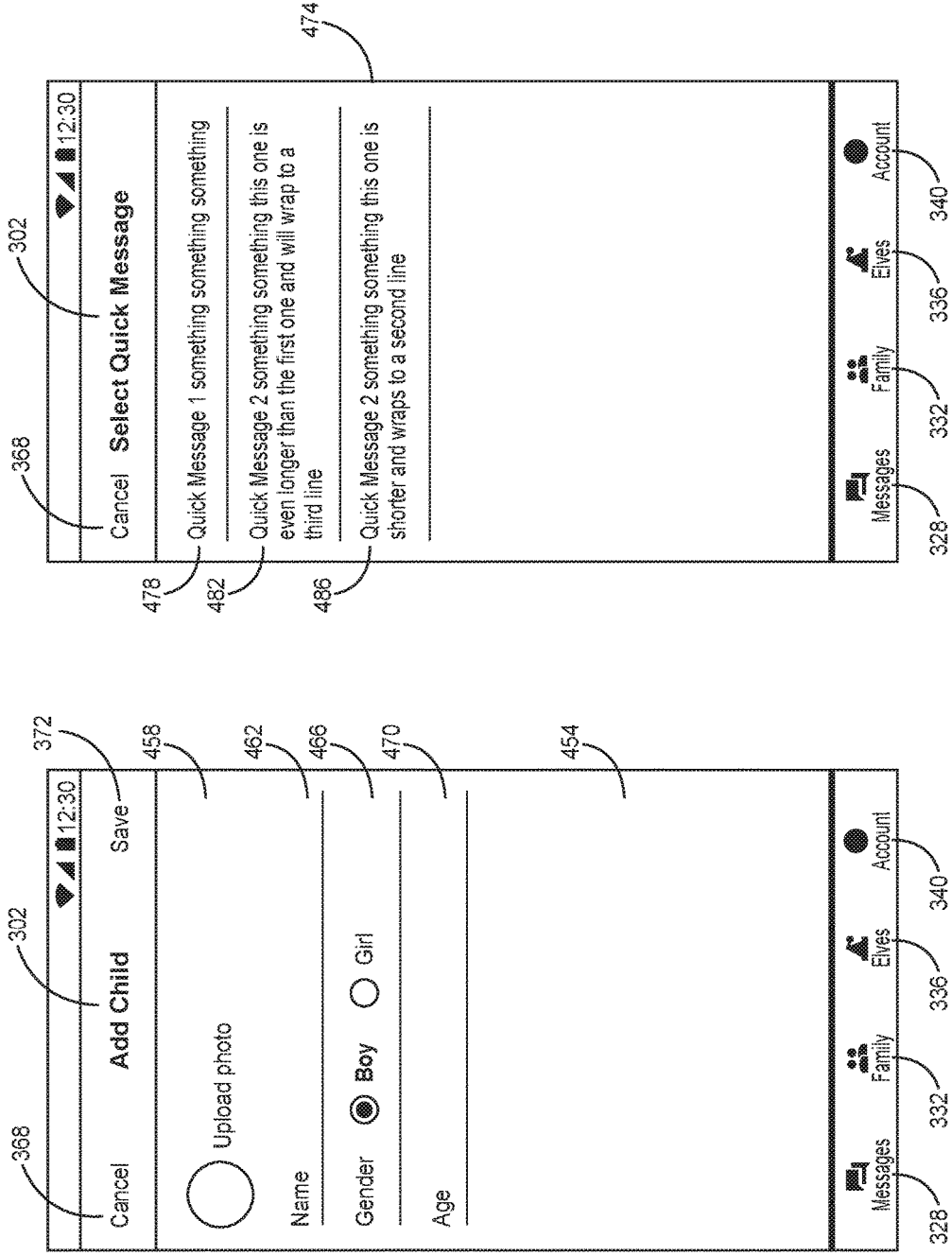

HOLIDAY TELEPHONE APPARATUS, SYSTEM AND METHOD

CROSS-REFERENCES

This patent application claims priority to provisional patent application No. 62/359,776 filed on Jul. 8, 2016, by Kathleen M. Von Duntz and titled: "Holiday Telephone Apparatus, System and Method" which provisional application is fully incorporated by reference herein.

TECHNICAL FIELD

This invention relates generally to toy phones and, more particularly, to an interactive toy phone programmable by a smartphone app.

BACKGROUND

Parents use the Elf on the Shelf, Santa letters, Santa apps, and generic Santa telephone calls about once a year. The Elf on the Shelf is a plush toy that does not speak and therefore, does not make the personal connection with the child. The apps that are currently on the market do not provide a personalized message for the child and instead use generic messages.

Thus there is a need for a holiday telephone apparatus, system and method that overcomes the above listed and other disadvantages.

SUMMARY OF THE INVENTION

The disclosed invention relates to a holiday telephone system comprising: a smartphone; a holiday telephone in wireless communication with the smartphone; a holiday telephone app installed on the smartphone, where the app is configured to perform a method, the method comprising: creating a new message by inputting a message into the app via the smartphone; selecting an elf character to speak the message; scheduling the app to cause the holiday telephone to ring at predetermined date, and time; and playing the message as recited by the elf character when the telephone is answered.

The disclosed invention also relates to a non-transitory computer-readable medium includes a set of instructions stored thereon that when accessed by a processor enable the processor to perform a method of creating and scheduling a message to be delivered via a telephone, the method comprising: opening a messages page by default; determining whether the user selects to continue with messages; creating a new message if the user selects to continue with messages; determining whether the user selects to use most recently messaged child; choosing select elf, edit elf, or add new elf, if the user selects to use most recently messaged child; selecting an elf character, if the user chose select elf option; choosing enter message or quick message; entering message, if the user chose enter message option; choosing call now or schedule time for message; entering date and time for telephone message to be delivered to a telephone, if the user chose schedule time for message; displaying scheduled message; changing elf name, changing ringtone associated with elf, changing voice associated with elf, changing gender of elf, if the edit elf option was selected in the choosing select elf, edit elf, or add new elf query; returning to the selecting an elf character query; entering name of new elf; entering gender of new elf, selecting ringtone associated with new elf, selecting voice associated with new elf, if add new elf is selected at the choosing select elf, edit elf, or add new elf query.

BRIEF DESCRIPTION OF THE DRAWINGS

The present disclosure will be better understood by those skilled in the pertinent art by referencing the accompanying drawings, where like elements are numbered alike in the several figures, in which:

FIG. 13 is one embodiment of a screen capture of the default message page;

FIG. 14 is one embodiment of a screen capture of the Family page;

FIG. 15 is a one embodiment of a screen capture of a new message page;

FIG. 16 is one embodiment of a screen capture of a select child page;

FIG. 17 is one embodiment of a screen capture of a select elf page;

FIG. 18 is one embodiment of a screen capture of a New Elf page;

FIG. 21 is one embodiment of a screen capture of a Add Child page;

FIG. 22 is one embodiment of a screen capture of a Select Quick Message page.

DETAILED DESCRIPTION OF THE INVENTION

The invention may be a replacement of the Elf on the Shelf. The invention comprises a toy telephone that may be blue tooth capable and associated with a smart device application ("app"). The parent of a child or other adult can use the app to set up a telephone call from a Christmas characters, such as: Santa, an Elf, reindeer, etc. The parent can type in or record a message from the Christmas Character that is personalized to the child. The app can translate the text message to a voice message. Or the app can change the voice of a recorded parent to Santa's voice, or an Elf's voice, etc. Then, on a pre-set time, the app will cause the Kringle Jingle Santa Telephone to ring (probably a Christmas tune), and the child will answer the telephone and hear a message from a Christmas character (as typed in or recorded by parent). The parent can set up daily calls for the child around Christmas, or really any holiday or birthday.

Figure 1:
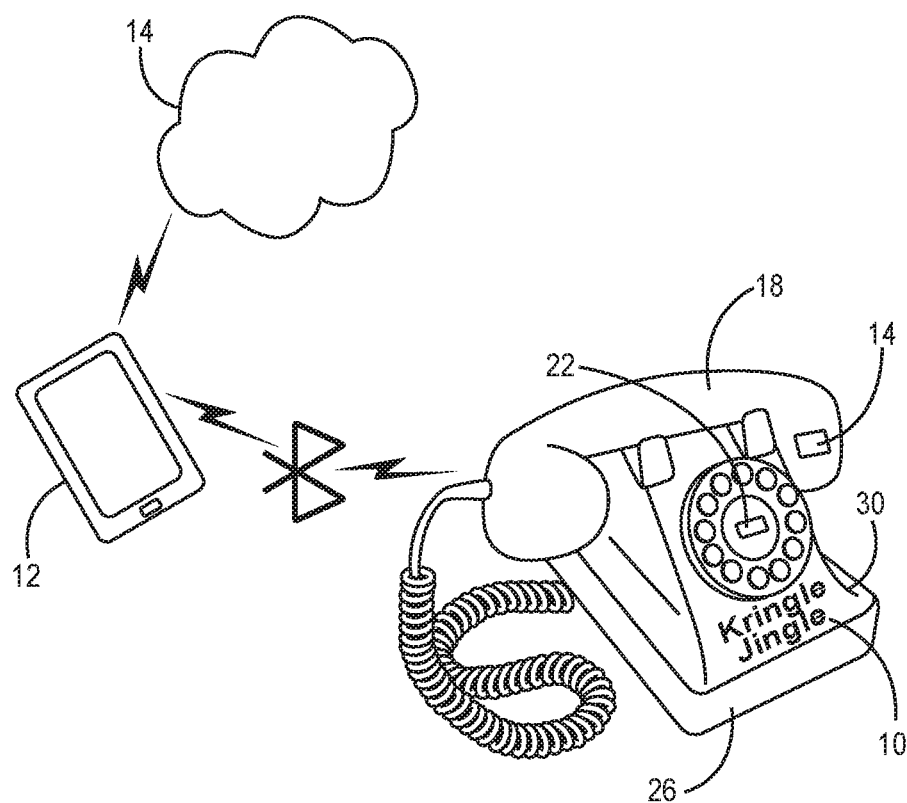
FIG. 1 is schematic diagram of one embodiment of the system.
Figure 2:
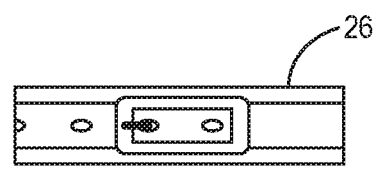
FIG. 2 is a detail view of the perimeter of the telephone base.

Attached as FIG. 1 is one embodiment of the system. In one embodiment, a telephone 10 is in communication with a smartphone 12. In one embodiment, the telephone and smartphone 12 may communication via wireless communication, such as but not limited to Bluetooth. The smartphone 12 will generally be in communication with a network 14. The telephone 10 may be a Vintage Kettle desk style telephone 10 that is made out of plastic. The telephone 10 may be a cherry red telephone with high gloss finish. In one embodiment, there may be a Bluetooth speaker 14 located in the handle 18 of the telephone. In one embodiment, the middle dial button may be replaced with a logo 22. In one embodiment, below the circular dial there may be printed the name: The Kringle Jingle. The perimeter 26 of the base 30 may have a design showing Santa's belt, the perimeter of the base shown in detail in FIG. 2. Santa's belt may be generally a black band with gold buckle. In other embodiments, the telephone may instead or also be in communication with the network 14.

Figure 3:
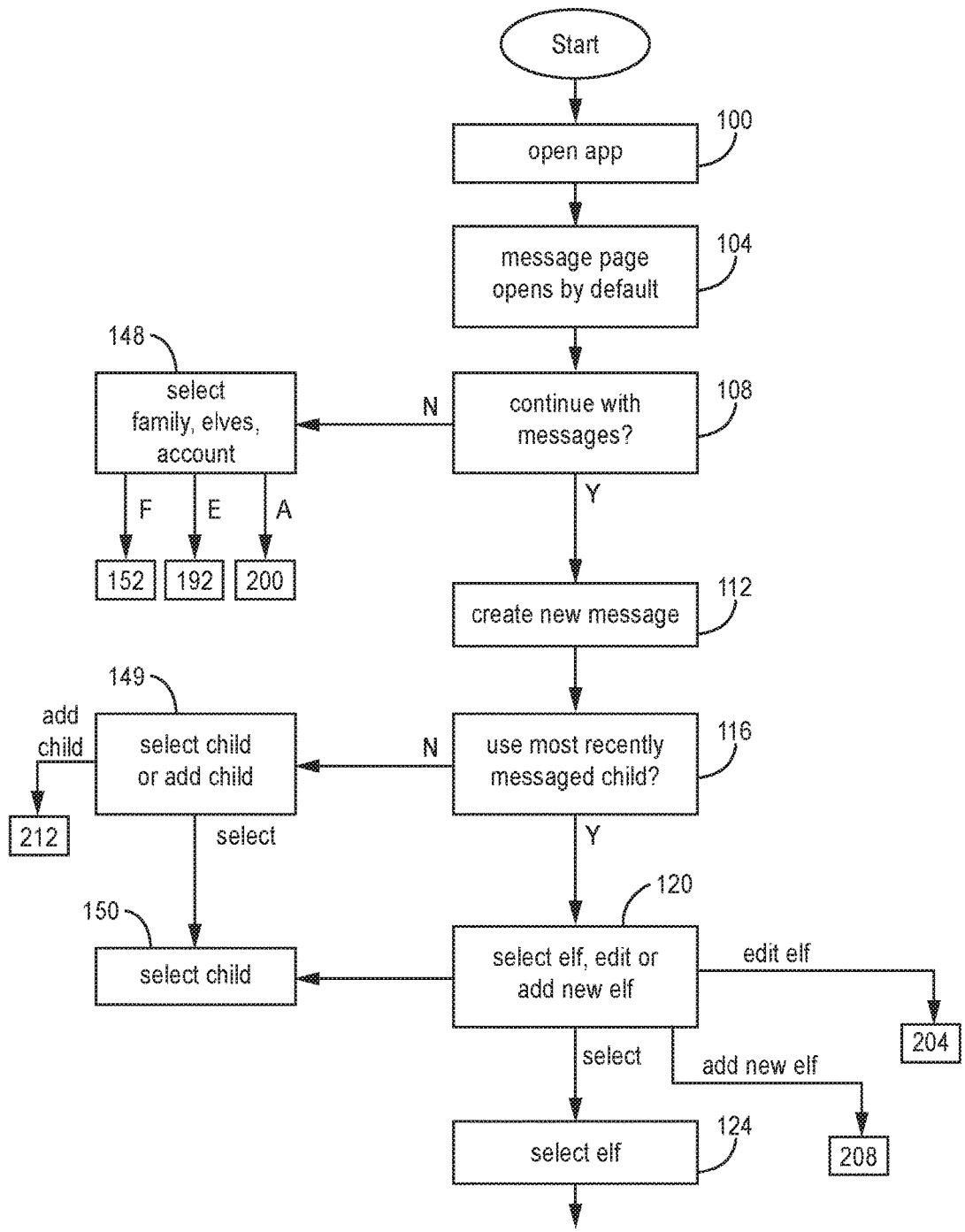
FIG. 3 is a portion of a flowchart showing one embodiment of the app.

FIG. 3 is a portion of a flowchart showing one embodiment of the app. At act 100, the user opens the app. At act 104, the app opens the messages page by default. At query 108, the user chooses whether to continue with messages. At act 112 the user starts creating a new message. At query 116, the user can choose whether to select the child who was the most recently messaged child. At query 120 the user can select the elf, edit elf, or add new elf. In this disclosure, elf can include elves, Santa Clause, or other characters. At act 124, the user selects the elf he wants to be the character sending the message to the child. At query 149, the user can select a listed child, or add a new child. At act 150, the user selects a listed child.

Figure 4:
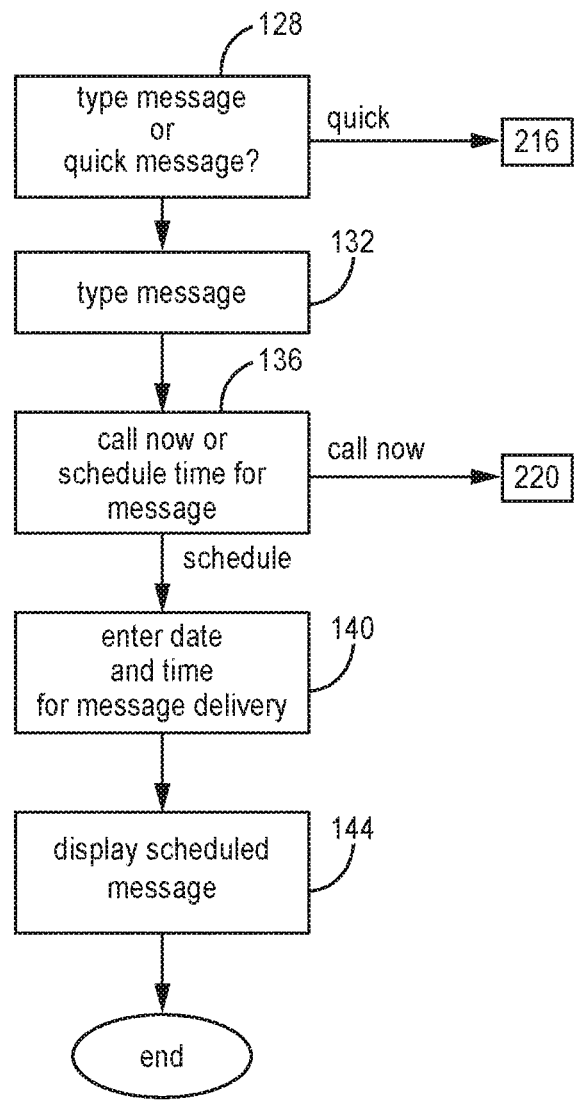
FIG. 4 is a continuation of the flowchart from FIG. 3.

FIG. 4 is a continuation of the flowchart from FIG. 3. At query 128, the user elects to type a message or to use a quick message. At act 132, the user types his message. At query 136, the user elects to call the telephone now, or schedule a time for telephone to ring. At act 140, the user enters the date, and time for the telephone to be called and the message to be delivered to the child. At act 144, the app displays the scheduled messages.

Figure 5:
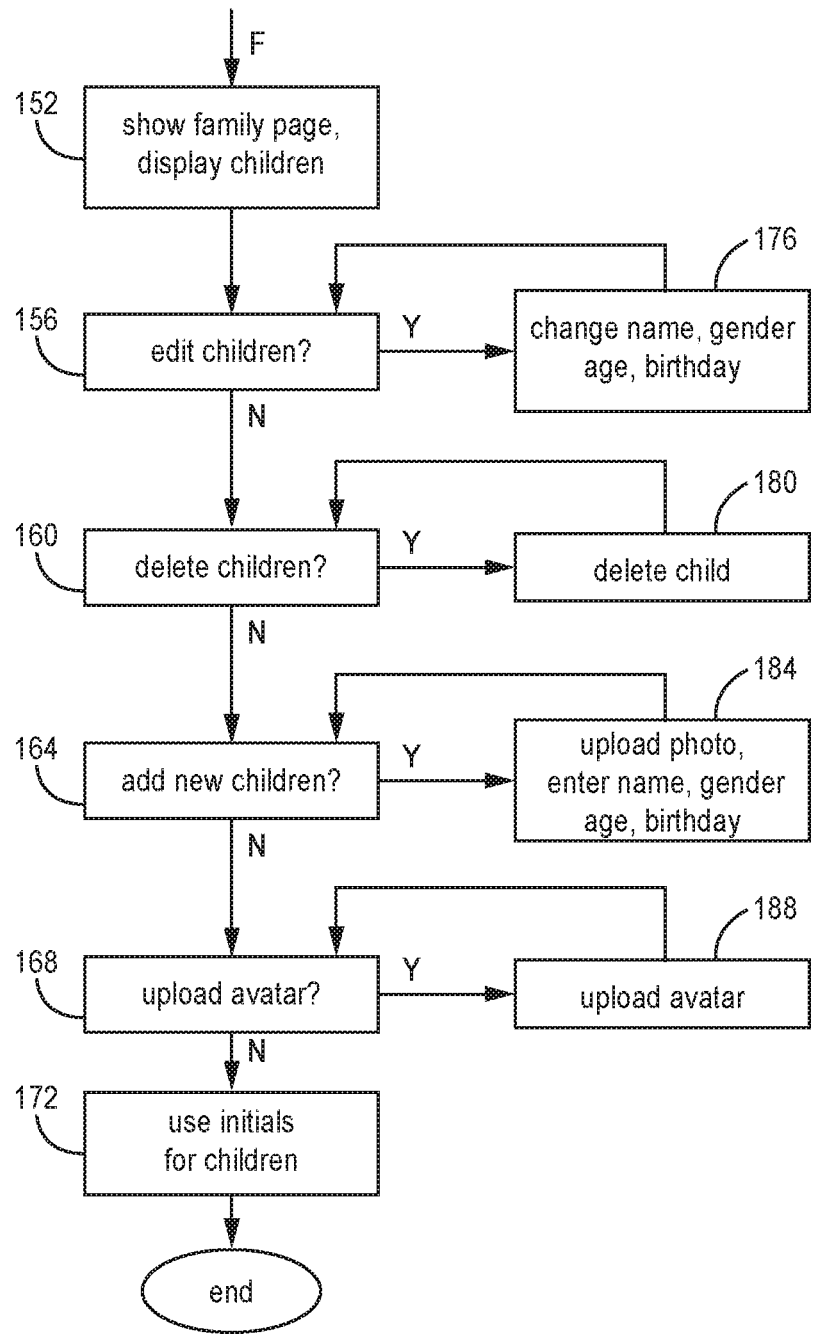
FIG. 5 is a flowchart showing one embodiment of a portion of the app.

In FIG. 3 at query 148, the user selects the family option, elves option, or the account option. If the user selections the family option, then the app proceeds to act 152 in FIG. 5. At act 152, the family page is shown displaying the children already entered into the app, if any. At query 156 the user has the option to edit children already entered in to the app. At act 176, the user has the option to change the name, gender, age, and/or birthday of the child. At query 160, the user has the option to delete children from the app. At act 180, the user can delete the child (ren) from the app. At query 164, the user has the option to add new children to the app. At act 184, the user can upload a photo of the child, enter the name of the child, enter the gender of the child, enter the age of the child, and/or enter the birthday of the child. At query 168, the user has the option to upload an avatar or photo of the child. At act 188, the user uploads an avatar for the child. At act 172 the app assigns initials to the child.

Figure 6:
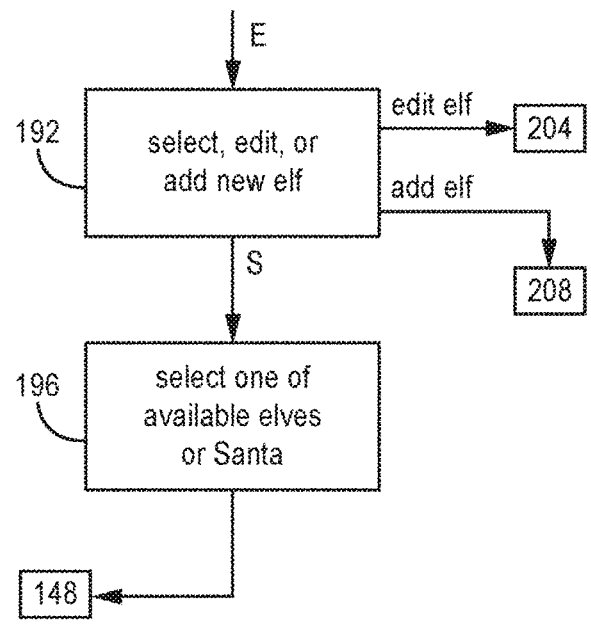
FIG. 6 is a flowchart showing one embodiment of a portion of the app.

In FIG. 3 at query 148, if the user selects the elves option, then the app proceeds to query 192 in FIG. 6. At query 192, the user has the option to select, edit, or add a new elf. At act 196, the user has the option to select one of the available elves, including Santa Clause.

Figure 7:
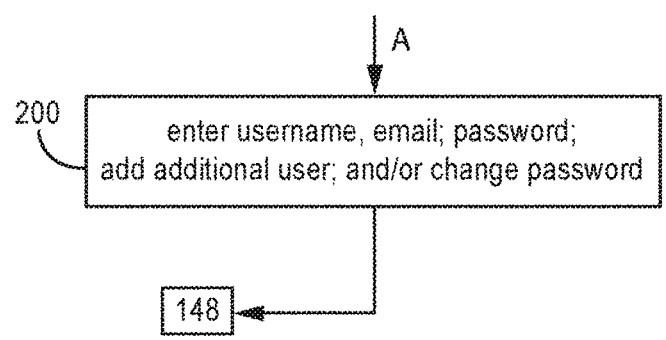
FIG. 7 is a flowchart showing one embodiment of a portion of the app.

In FIG. 3 at query 148, if the user selects the account option, then the app proceeds to act 200 in FIG. 7. At act 200, the user can enter a username, email address, password, addition additional users, and or change password.

Figure 8:
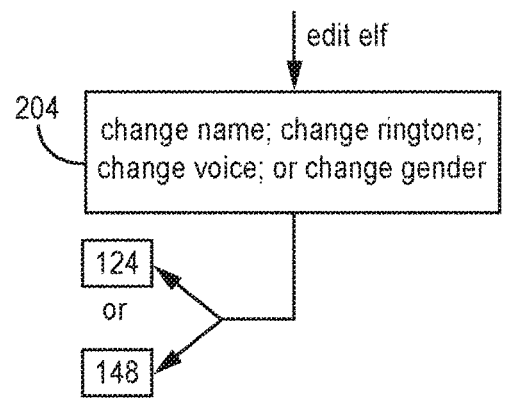
FIG. 8 is a flowchart showing one embodiment of a portion of the app.

At act 204 in FIG. 8, the user can edit an elf by changing the elf's name, change ringtone associated with elf, change voice of elf, and/or change the gender of the elf.

Figure 9:
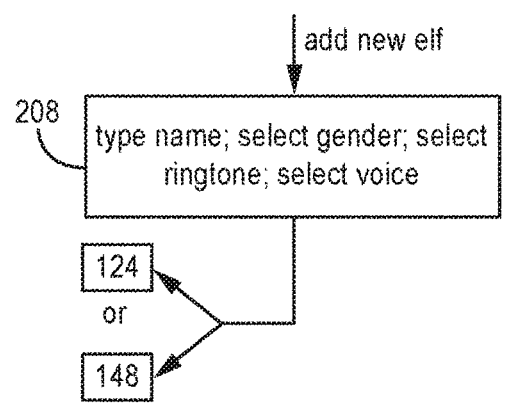
FIG. 9 is a flowchart showing one embodiment of a portion of the app.

In FIG. 9, at act 208, the user can add a new elf. The user has the option to type in a new elf name, enter gender of elf, enter ringtone associated with the elf, and select voice of the elf.

Figure 10:
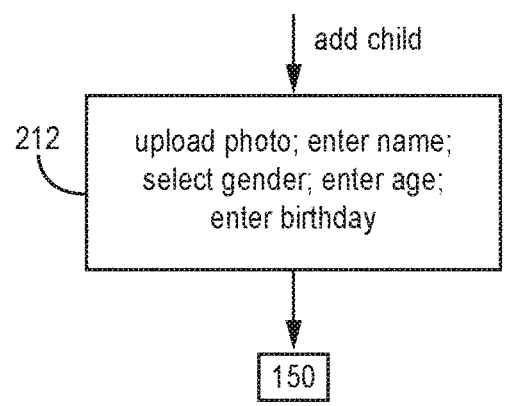
FIG. 10 is a flowchart showing one embodiment of a portion of the app.

In FIG. 10, at act 212, the user can add a child. The user has the option to upload the child's photo, enter the child's name, select gender, enter age, and enter birthday.

Figure 11:
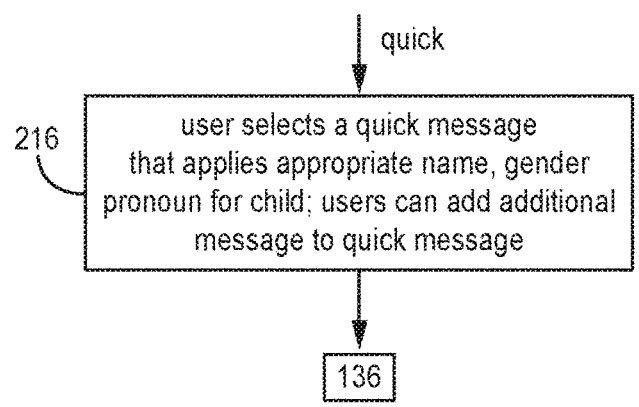
FIG. 11 is a flowchart showing one embodiment of a portion of the app.

In FIG. 11, at act 216, the user can make a quick message. In this act, the user can select a quick message that applies appropriate name, gender pronouns for child, users can add additional message to the quick message.

Figure 12:
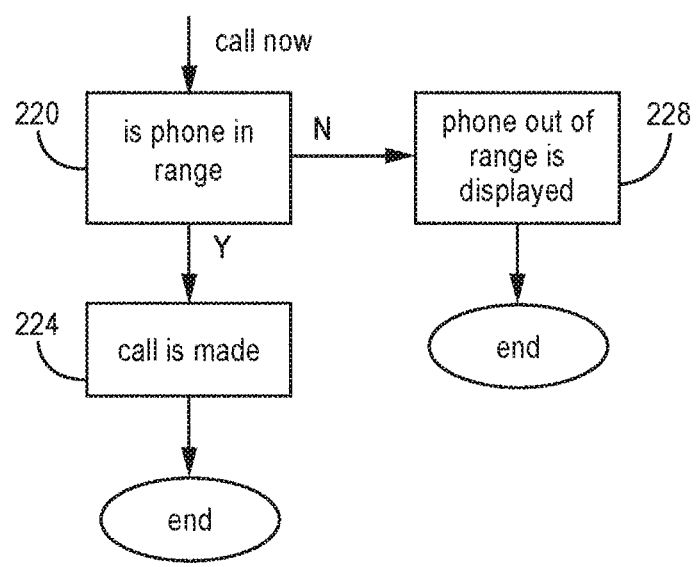
FIG. 12 is a flowchart showing one embodiment of a portion of the app.

In FIG. 12, the user can set the app to call now. At act 220, the app determines whether the telephone is in range with the smartphone. At act 224, the call is made by the app, if the telephone is in range. At act 228, the app displays a telephone out of range screen, if the phone is out of range.

FIG. 13 is a drawing of one embodiment of a screen capture of the default message page 298, referred to by act 104 in FIG. 3. The title of page 302 is shown as "messages". In FIG. 13, one can see an edit link 300. The edit link 300 will be on various pages, and will allow you to edit different items, depending on what page you are on, in this case, the page is a Messages page, and thus the edit link 300 will allow one to edit messages. There is a new button 304. Similarly to the edit link 300, the new button 304 will be on various pages, and will allow you to create different new items, depending on what page you are on, in this case, the page is a Messages page, and thus the new button 304 will allow one to add a new message. Each message shows who the message is directed to at 312, the message 316, who the message is from 320, and the scheduled date and time the message will be delivered via telephone call 324. At the bottom of each page are buttons for messages 328, family 332, elves 336, and account 340. Note how the messages button 328 is greyed out because the user is on the messages page.

FIG. 14 is a drawing of one embodiment of a screen capture of the Family page 344. On this page, each of the already children 348 are shown. The name 352 of each child, sex 356, and age 360 are shown.

FIG. 15 is a drawing of one embodiment of a screen capture of a new message page 364. In this page, there is a cancel link 368, and a save link 372. The cancel link 368 will be on various pages, and will allow you to cancel different items, depending on what page you are on, in this case, the page is a New Message page, and thus the cancel link 368 will allow one to cancel creating a New Message. Similarly to the cancel link 368, the save link 372 will be on various pages, and will allow you to save different items, depending on what page you are on, in this case, the page is a New Message page, and thus the save link 372 will allow one to save the new message created. There is a schedule message button 376, and a call now button 380. The default action of the app may be to leave the last child a message was sent to, in the message to field 384. There is also an add quick message link 378. There is also a message from field 386, and a message field 387.

FIG. 16 is a drawing of one embodiment of a screen capture of a select child page 388. In this page, there is a cancel link 368, that allows one to cancel the select child portion of the app. In this example, two children 348 have already been entered into the app. There is an add a new child link 398.

FIG. 17 is a drawing of one embodiment of a screen capture of a select elf page 402. In this page, there is a cancel link 368, that allows one to cancel the select elf portion of the app. In this example, three elves 406 have already been entered into the app. Santa 406, is considered a boy, has a Santa ringtone associated with him, and has a Santa voice associated with him. Peppermint 406 is an elf, who is a boy, associated with a Twinkle ringtone, and associated with a twinkle voice. Sugarplum 406 is an elf, who is a girl, associated with a Sugarplum ringtone, and associated with a Sugarplum voice. There is also an edit link 410, that allows one to edit the elf, and an add new elf link 414, that allows one to add a new elf.

FIG. 18 is a drawing of one embodiment of a screen capture of a New Elf page 418. In this page, there is a name field 422 to give the new elf a name, a gender select field 426 for the new elf, a ringtone select field 430 to associate a ringtone to the new elf, and a voice select field 434 for the new elf.

Figure 19:
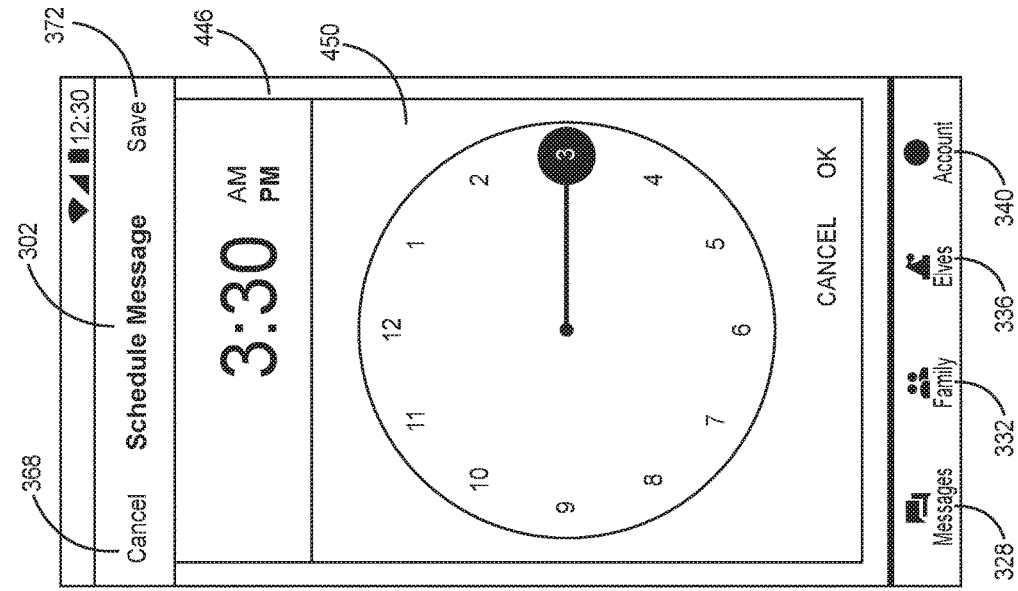
FIG. 19 is one embodiment of a screen capture of a Schedule Message page.

FIG. 19 is a drawing of one embodiment of a screen capture of a Schedule Message page 438. In this page, there is a calendar 442 where one can select the day, month, and year that the telephone will ring for the child.

Figure 20:
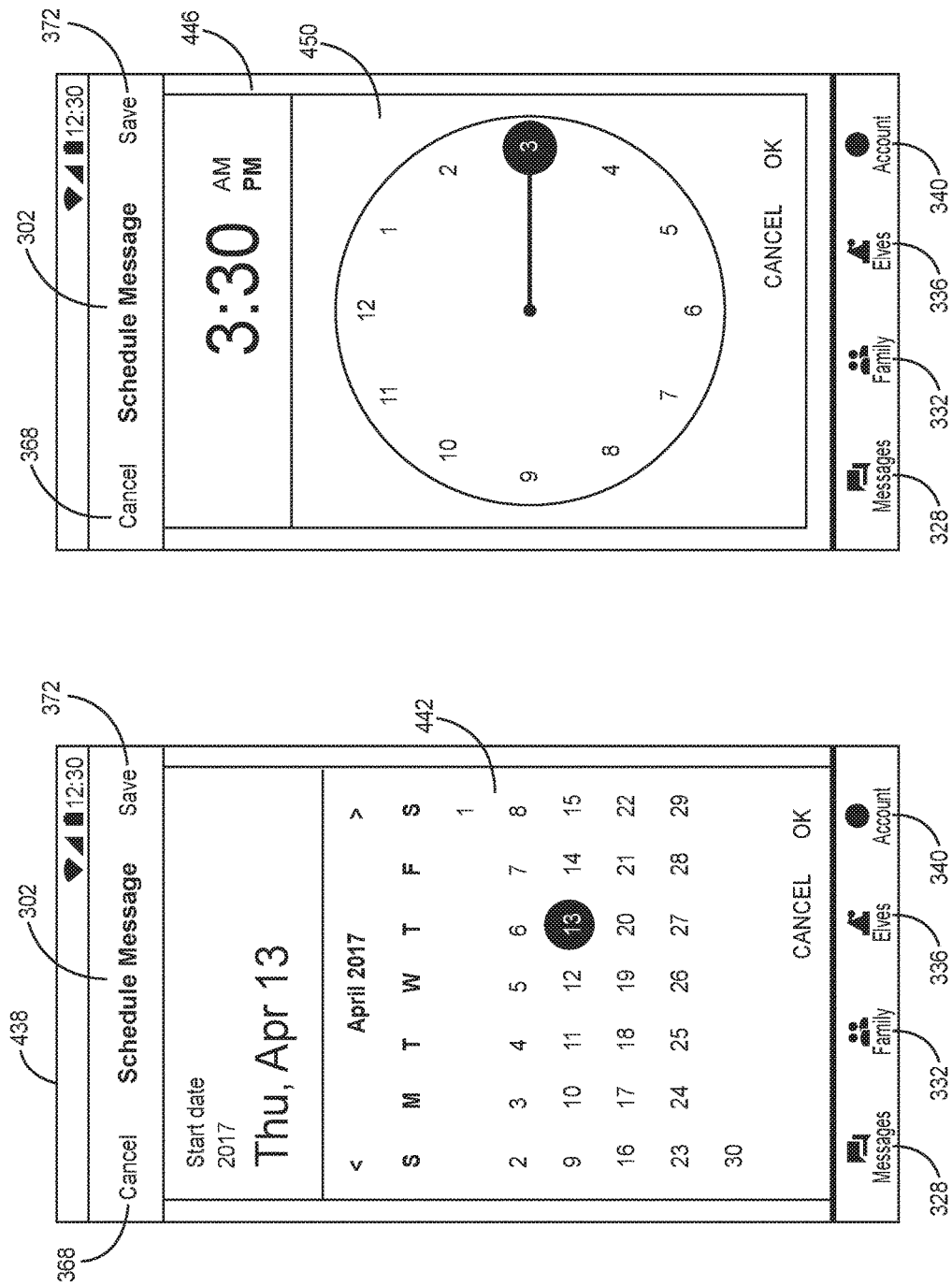
FIG. 20 is one embodiment of a screen capture of a Schedule Message page.

FIG. 20 is a drawing of one embodiment of a screen capture of a Schedule Message page 446. In this page, there is a clock 450 where one can select the time that the telephone will ring for the child.

FIG. 21 is a drawing of one embodiment of a screen capture of a Add Child page 454. There is an upload photo of the child field 458, a name field 462 to enter the child's name, a gender field 466 to enter the gender of the child, and an age field 470 to enter the age of the child. In other embodiments, there may also be a birthday field.

FIG. 22 is a drawing of one embodiment of a screen capture of a Select Quick Message page 474. In this example, there may be three pre-loaded quick messages 478, 482, 486 that the parent can select, instead of having to think up of a message on their own.

Figure 23:
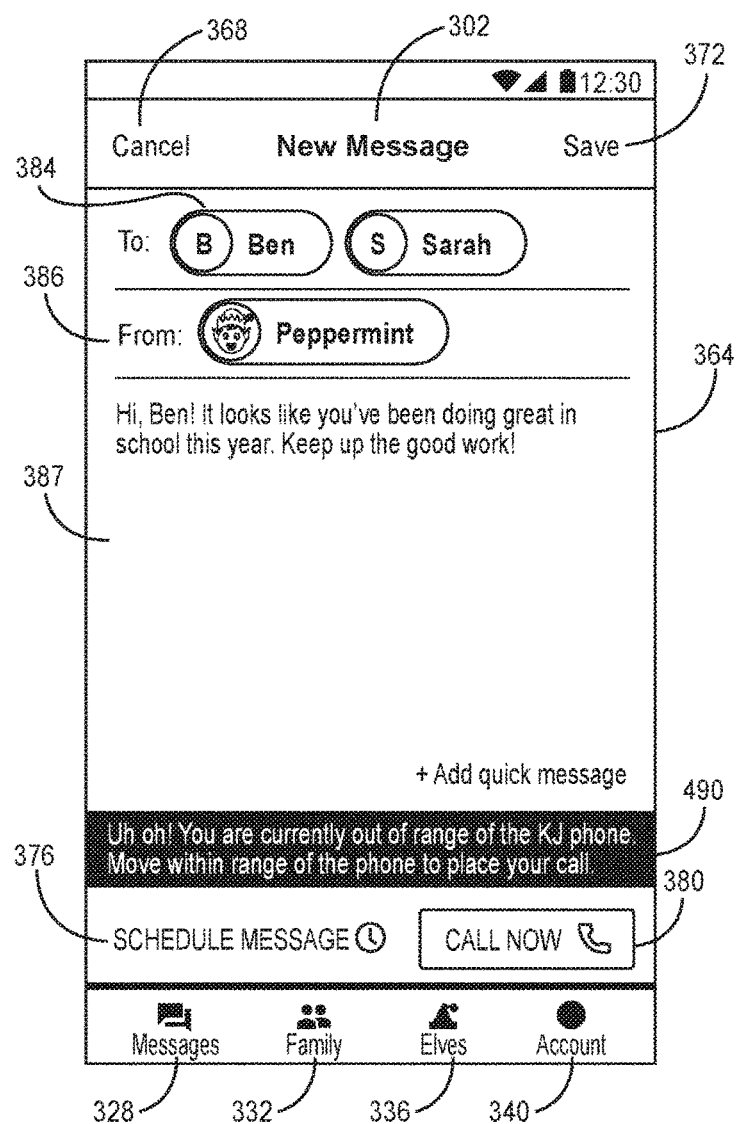
FIG. 23 is one embodiment of a screen capture of a new message page.

FIG. 23 is a drawing of one embodiment of a screen capture of a new message page 364. However, in this figure, the call now button 380 has been pressed, but the telephone was out of range. Thus a message 490 to the user appears warning the user that the phone is out of range.

In one embodiment, the invention will appear as a vintage desk telephone; however, it will not have any calling capabilities. It may be a shiny red toy telephone that will have a Bluetooth speaker inside of it. An app will be used for parents or other users to create a daily personalized message from the North Pole, in which parents will decide when the Kringle Jingle will call their children. It will essentially be a listening device to hear the recorded personalized message designed for each child individually.

When the telephone jingles, the children can pick up the handle and listen to their message from the North Pole. They will have a designated elf assigned to them that will relay messages from Santa. However, on December 24$^{th}$ the parents can select Santa to call their child to let them know he is preparing for a stop at their home. Santa may also call on December 26$^{th}$ to say goodbye and to check-in to make sure they loved the toys he delivered just for them.

The app may be available year-round though, so if the users desire that the telephone ring throughout the year, the users can set that up, and an elf will be speak to their child. All personalization will take place on the app. The users can choose the gender, elf name, elf voice, children's names, etc. This invention is designed to make messages personal to each child with specific daily messages that will be designed by parents or other users themselves. The invention may meet the need for promoting positive behavior in children by having parents create the illusion that Santa and his elves are watching them from the North Pole. This technique will create a bond with the children and their belief of the North Pole, which will instill a deep and positive connection. The invention may be used as a behavior modification tool which will promote positive behavior in children. When a child believes the magic of Santa is watching them, they will in return maintain positive behavior. In their minds they want the stimulus of presents, which will be given to them with good behavior. Using this tool will reinforce what parents try to ingrain in their households on a daily basis, as well as, teachers in schools across the globe. Positive behavior is something every child can accomplish and become good at.

Although the invention has been described with respect to the Christmas holiday, the invention can be modified to be used for many other holidays and occasions, such as, but not limited to birthdays, Halloween, Hanukah, Kwanza, thanksgiving, fourth of July, Easter, etc.

Throughout this patent application, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed smart phones, tablets, or hand held computers are also deemed to comprise computing devices having a processor and a non-transitory memory storing instructions executable by the processor that cause the device to control, manage, or otherwise manipulate the features of the disclosed apparatuses, systems and methods.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A holiday telephone system comprising:
   a smartphone;

a holiday telephone in wireless communication with the smartphone;

a holiday telephone app installed on the smartphone, wherein the app is configured to perform a method, the method comprising:

creating a new message by inputting a message into the app via the smartphone;

selecting an elf character to speak the message;

scheduling the app to cause the holiday telephone to ring at predetermined date, and time;

playing the message as recited by the elf character when the telephone is answered, opening app to a messages page by default;

determining whether the user selects to continue with messages;

creating a new message if the user selects to continue with messages;

determining whether the user selects to use most recently messaged child;

choosing select elf, edit elf, or add new elf, if the user selects to use most recently messaged child;

selecting an elf character, if the user chose select elf option;

choosing an enter message option or a select quick message option;

entering a new message, if the user chose the enter message option;

choosing a call now option or a schedule time for message option;

entering date and time for app to call telephone, if the user chose schedule time for message, displaying scheduled message in app, changing elf name, changing ringtone associated with elf, changing voice associated with elf, changing gender of elf, if the edit elf option was selected in the choosing select elf, edit elf, or add new elf query;

returning to the selecting an elf character query;

entering name of new elf; entering gender of new elf, selecting ringtone associated with new elf, selecting voice associated with new elf, if add new elf is selected at the choosing select elf, edit elf, or add new elf query;

selecting one of the following options: family option, elves option, or account option, if the user does not want to continue with messages;

selecting family option;

showing family page and displaying children currently entered into the app;

determining whether the user selects to edit children;

determining whether the user selects to delete children, if the user determines not to edit children;

determining whether use selects to add new children, if the user determines not to delete children, determining whether the user selects to upload avatar for children, if the user determines not to add new children; and using initials for children, if the user determines not to upload avatar for children.

2. The holiday telephone answering system of claim 1, wherein the holiday telephone app further comprises:

selecting the elves option, at the selecting one of the following options: family option, elves option, or account option query;

selecting option of select elf option, edit elf option, or add new elf option;

selecting one of available elves or Santa Claus;

returning to the selecting one of the following options: family option, elves option, or account option query changing elf name, changing ringtone associated with elf, changing voice associated with elf, changing gender of elf, if the edit elf option was selected in the selecting option of select elf option, edit elf option, or add new elf option query;

returning to the selecting one of the following options: family option, elves option, or account option query;

entering name of new elf; entering gender of new elf, selecting ringtone associated with new elf, selecting voice associated with new elf, if the add new elf option was selected in the selecting option of select elf option, edit elf option, or add new elf option query;

returning to the selecting one of the following options: family option, elves option, or account option query.

3. The holiday telephone answering system of claim 1, wherein the holiday telephone app further comprises:

selecting the account option, at the selecting one of the following options: family option, elves option, or account option query;

entering username, entering email address; entering password; add additional user, and or changing password;

returning to the selecting one of the following options: family option, elves option, or account option query.

4. The holiday telephone answering system of claim 1, wherein the holiday telephone app further comprises:

uploading photo of new child; entering name of new child, selecting gender of new child, entering age of new child, entering birthday of new child, if add new children is selected at the determining whether use selects to add new children, if the user determines not to delete children query.

5. The holiday telephone answering system of claim 1, wherein the holiday telephone app further comprises:

selecting a quick message that applies appropriate name, gender pronouns for child;

adding additional message to quick message, if the select quick message option is chosen at the choosing an enter message or a select quick message option query.

6. The holiday telephone answering system of claim 1, wherein the holiday telephone app further comprises:

determining whether the telephone is in range of the smartphone, if the call now option is chosen at the choosing a call now option or a schedule time for message option query;

making call if telephone is in range of smartphone;

displaying "telephone is out of range" message if telephone is out of range of smartphone.

7. A non-transitory computer-readable medium includes a set of instructions stored thereon that when accessed by a processor enable the processor to perform a method of creating and scheduling a message to be delivered via a telephone, the method comprising:

opening a messages page by default;

determining whether the user selects to continue with messages;

creating a new message if the user selects to continue with messages;

determining whether the user selects to use most recently messaged child;

choosing select elf, edit elf, or add new elf, if the user selects to use most recently messaged child;

selecting an elf character, if the user chose select elf option;

choosing an enter message option or a select quick message option;

entering a new message, if the user chose the enter message option;

choosing call now or schedule time for message;
entering date and time for telephone message to be delivered to a telephone, if the user chose schedule time for message;
displaying scheduled message;
changing elf name, changing ringtone associated with elf, changing voice associated with elf, changing gender of elf, if the edit elf option was selected in the choosing select elf, edit elf, or add new elf query;
returning to the selecting an elf character query;
entering name of new elf; entering gender of new elf, selecting ringtone associated with new elf, selecting voice associated with new elf, if add new elf is selected at the choosing select elf, edit elf, or add new elf query;
selecting one of the following options: family option, elves option, or account option, if the user does not want to continue with messages;
selecting family option;
showing family page and displaying children currently entered into the computer-readable medium;
determining whether the user selects to edit children;
determining whether the user selects to delete children, if the user determines not to edit children;
determining whether use selects to add new children, if the user determines not to delete children;
determining whether the user selects to upload avatar for children, if the user determines not to add new children; and
using initials for children, if the user determines not to upload avatar for children.

8. The non-transitory computer-readable medium of claim 7, wherein the method further comprises:
selecting the elves option, at the selecting one of the following options: family option, elves option, or account option query;
selecting option of select elf option, edit elf option, or add new elf option;
selecting one of available elves or Santa Claus;
returning to the selecting one of the following options: family option, elves option, or account option query
changing elf name, changing ringtone associated with elf, changing voice associated with elf, changing gender of elf, if the edit elf option was selected in the selecting option of select elf option, edit elf option, or add new elf option query;
returning to the selecting one of the following options: family option, elves option, or account option query;
entering name of new elf; entering gender of new elf, selecting ringtone associated with new elf, selecting voice associated with new elf, if the add new elf option was selected in the selecting option of select elf option, edit elf option, or add new elf option query;
returning to the selecting one of the following options: family option, elves option, or account option query.

9. The non-transitory computer-readable medium of claim 7, wherein the method further comprises:
selecting the account option, at the selecting one of the following options: family option, elves option, or account option query;
entering username, entering email address; entering password; add additional user, and or changing password;
returning to the selecting one of the following options: family option, elves option, or account option query.

10. The non-transitory computer-readable medium of claim 7, wherein the method further comprises:
uploading photo of new child; entering name of new child, selecting gender of new child, entering age of new child, entering birthday of new child, if add new children is selected at the determining whether use selects to add new children, if the user determines not to delete children query.

11. The non-transitory computer-readable medium of claim 7, wherein the method further comprises:
selecting a quick message that applies appropriate name, gender pronouns for child;
adding additional message to quick message, if the select quick message option is chosen at the choosing an enter message option or a select quick message option query.

12. The non-transitory computer-readable medium of claim 7, wherein the method further comprises:
determining whether the telephone is in range of the smartphone, if the call now option is chosen at the choosing a call now option or a schedule time for message option query;
making call if telephone is in range of smartphone;
displaying "telephone is out of range" message if telephone is out of range of smartphone.

\* \* \* \* \*